US007882643B1

(12) United States Patent  (10) Patent No.: US 7,882,643 B1
Portinen  (45) Date of Patent: Feb. 8, 2011

(54) SQUARE AND LEVELING TOOL

(76) Inventor: Bernard H. Portinen, 136 W. Chapman St., Ely, MN (US) 55731

( * ) Notice: Subject to any disclaimer, the term of this patent is extended or adjusted under 35 U.S.C. 154(b) by 0 days.

(21) Appl. No.: 12/629,654

(22) Filed: Dec. 2, 2009

(51) Int. Cl.
    *B43L 7/027* (2006.01)
(52) U.S. Cl. .......................................... 33/474; 33/451
(58) Field of Classification Search ................... 33/429, 33/451, 474, 475, 476, 477, 478, 479, 481
    See application file for complete search history.

(56) References Cited

U.S. PATENT DOCUMENTS

| 513,665 A | 1/1894 | Barberie |
| 1,097,393 A * | 5/1914 | Criswell ...................... 33/481 |
| 1,135,259 A | 4/1915 | Cokely |
| 1,845,801 A * | 2/1932 | Kupferman .................. 33/375 |
| 3,524,259 A | 8/1970 | Handley |
| 4,138,819 A | 2/1979 | Sosin |
| 4,420,891 A | 12/1983 | Orem |
| 4,573,276 A * | 3/1986 | Torczon ...................... 33/481 |
| 4,693,011 A | 9/1987 | Strayham |
| 4,736,525 A | 4/1988 | Deason |
| 5,720,114 A | 2/1998 | Guerin |
| 5,749,154 A | 5/1998 | Scharf |
| 5,771,597 A * | 6/1998 | Hopf ........................... 33/474 |
| 5,855,073 A * | 1/1999 | Boelling ...................... 33/533 |
| 6,996,911 B1 | 2/2006 | Dinius |
| 2003/0140512 A1* | 7/2003 | Jevons et al. .................. 33/481 |
| 2004/0003506 A1* | 1/2004 | Cuell .......................... 33/478 |
| 2009/0139104 A1* | 6/2009 | Rohweder ..................... 33/478 |

* cited by examiner

*Primary Examiner*—G. Bradley Bennett
(74) *Attorney, Agent, or Firm*—Neustel Law Offices

(57) ABSTRACT

A square and leveling tool for measuring exterior and interior corners along buildings, corner posts, rafters, etc. The tool generally includes a first arm having measuring indicia disposed and a second arm having measuring indicia, wherein the second arm is angularly disposed from the first arm to form an approximate 90 degree angle with one another. An exterior corner section is pivotally connected to the first arm and the second arm along adjoining exterior edges, wherein the exterior corner section pivots to define an exterior notch adapted to flushly receive an interior corner for measuring and/or leveling. An interior corner notch is formed within adjoining interior edges of the first arm and the second arm to flushly receive an exterior corner post for measuring and/or leveling adjacent sides along the corner post. The tool may also include a plurality of levels for leveling the tool horizontally, vertically, etc.

20 Claims, 10 Drawing Sheets

SQUARE AND LEVELING TOOL

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a hand tool and more specifically it relates to a square and leveling tool for efficiently measuring exterior and interior corners along buildings, corner posts, rafters, etc.

2. Description of the Related Art

Any discussion of the related art throughout the specification should in no way be considered as an admission that such related art is widely known or forms part of common general knowledge in the field.

Levels and squares have been used widely in the past construction workers, builders, or other craftsman to linearly measure, level, and square various objects and structures. Typically, squares are comprised of an L-shaped structure. For various shaped corners, the L-shaped structure is not suitable for resting the first arm and the second arm against the adjacent sides which is often times necessary to truly square the corner, sides, etc.

Having the square efficiently be positioned around or along the exterior or interior corner can be especially useful in siding buildings where the siding piece from each adjacent side is generally desired to be level with a respective adjacent siding piece. Because of the inherent problems with the related art, there is a need for a new and improved square and leveling tool for efficiently measuring exterior and interior corners along buildings, corner posts, rafters, etc.

BRIEF SUMMARY OF THE INVENTION

A system for efficiently measuring exterior and interior corners along buildings, corner posts, rafters, etc. The invention generally relates to a tool which includes a first arm having measuring indicia disposed and a second arm having measuring indicia, wherein the second arm is angularly disposed from the first arm to form an approximate 90 degree angle with one another. An exterior corner section is pivotally connected to the first arm and the second arm along adjoining exterior edges, wherein the exterior corner section pivots to define an exterior notch adapted to flushly receive an interior corner for measuring and/or leveling. An interior corner notch is formed within adjoining interior edges of the first arm and the second arm to flushly receive an exterior corner post for measuring and/or leveling adjacent sides along the corner post. The tool may also include a plurality of levels for leveling the tool horizontally, vertically, etc.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
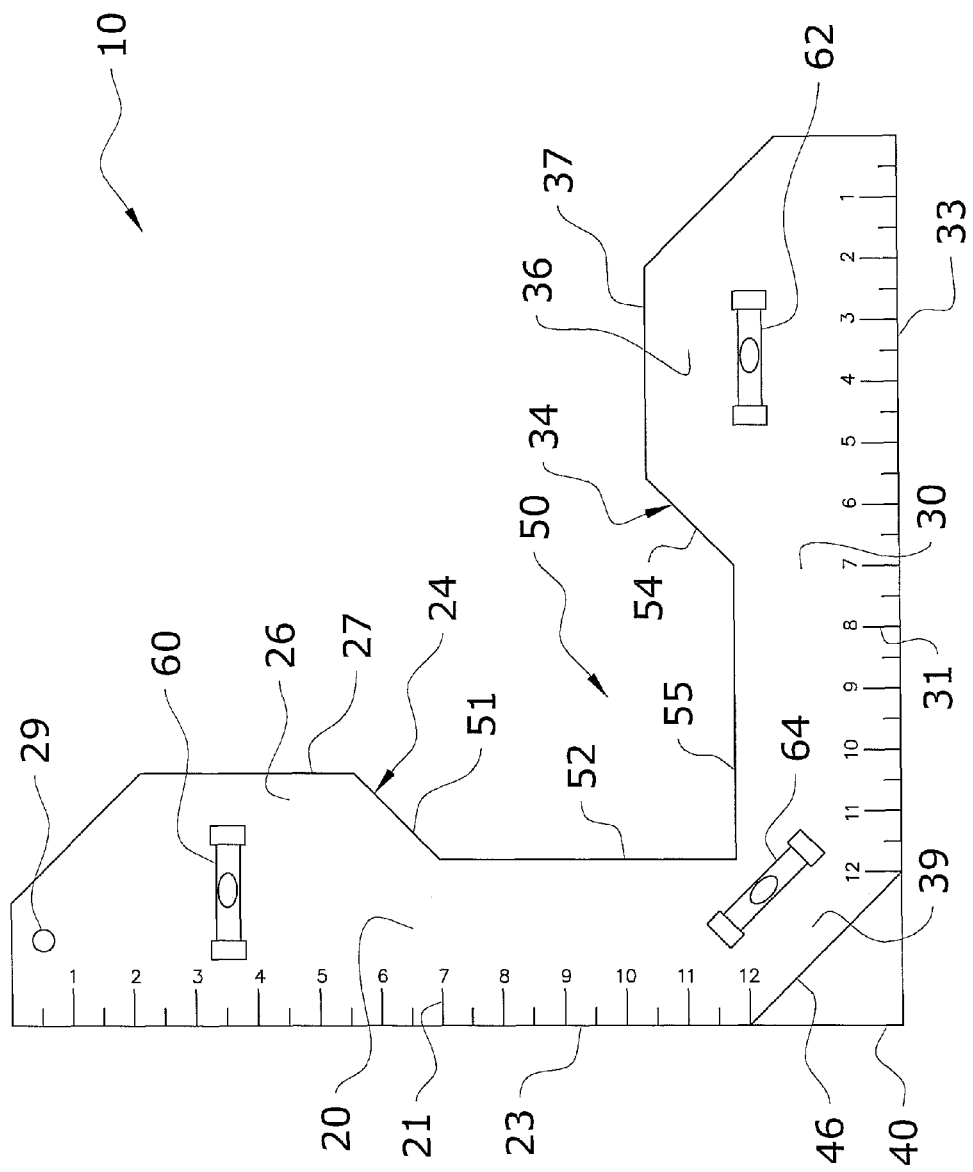
FIG. 1 is a top view of the present invention.

Turning now descriptively to the drawings, in which similar reference characters denote similar elements throughout the several views, FIGS. 1 through 10 illustrate a square and leveling tool 10, which comprises a first arm 20, 30 having measuring indicia 21, 31 disposed and a second arm 30 having measuring indicia 21, 31, wherein the second arm 30 is angularly disposed from the first arm 20 to form an approximate 90 degree angle with one another. An exterior corner section 40 is pivotally connected to the first arm 20 and the second arm 30 along adjoining exterior edges 23, 33, wherein the exterior corner section 40 pivots to define an exterior notch 45 adapted to flushly receive an interior corner 12 for measuring and/or leveling. An interior corner notch 50 is formed within adjoining interior edges 24, 34 of the first arm 20 and the second arm 30 to flushly receive an exterior corner post 14 for measuring and/or leveling adjacent sides 16 along the corner post. The tool 10 may also include a plurality of levels 60, 62, 64 for leveling horizontally, vertically, etc.

B. Arms

The arms 20, 30 are generally comprised of a similar length and construction. The arms 20, 30 generally form an L-shape via being disposed at a 90 degree angle to one another with respect to a linear length of each of the arms 20, 30. The arms 20, 30 may be comprised of various substantially rigid materials, such as but not limited to plastic, metal, wood, aluminum, or fiberglass.

Figure 2:
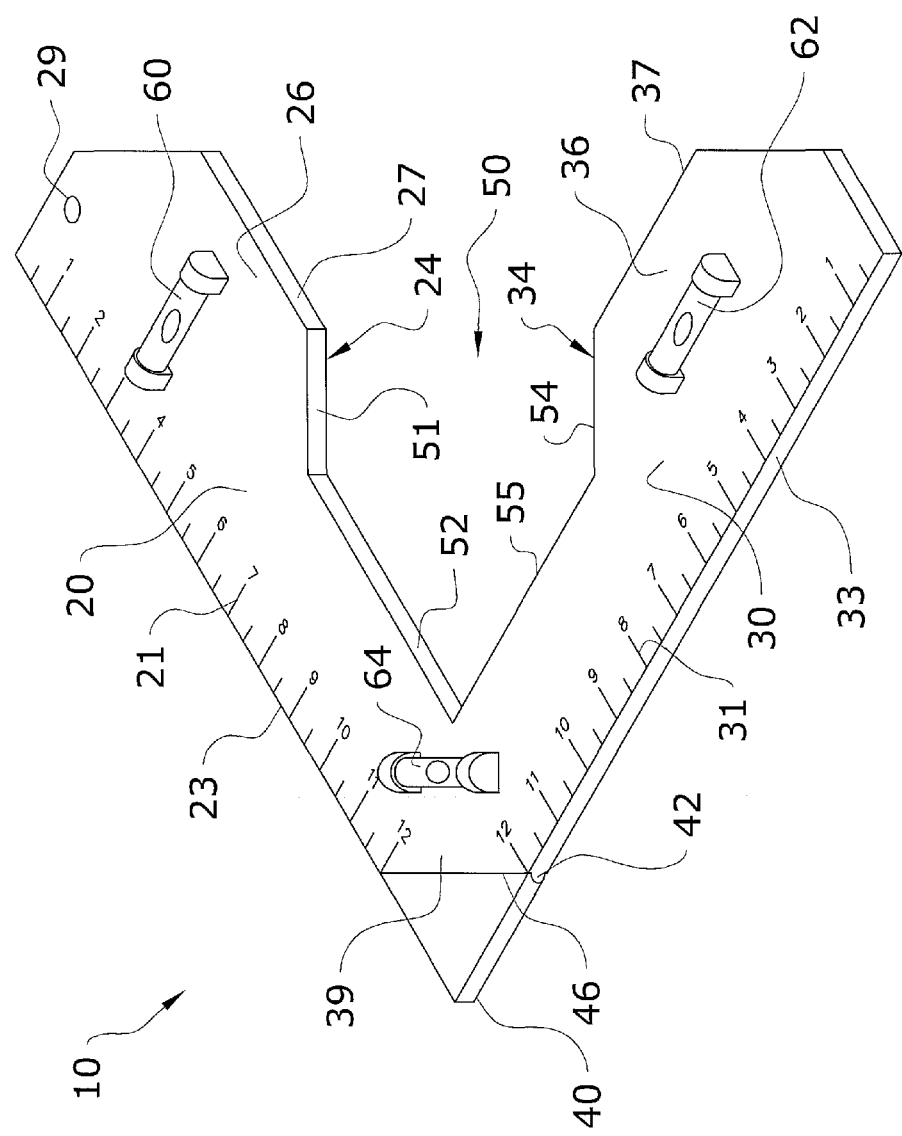
FIG. 2 is an upper perspective view of the present invention with the corner section pivoted within the exterior notch to conceal the exterior notch.
Figure 3:
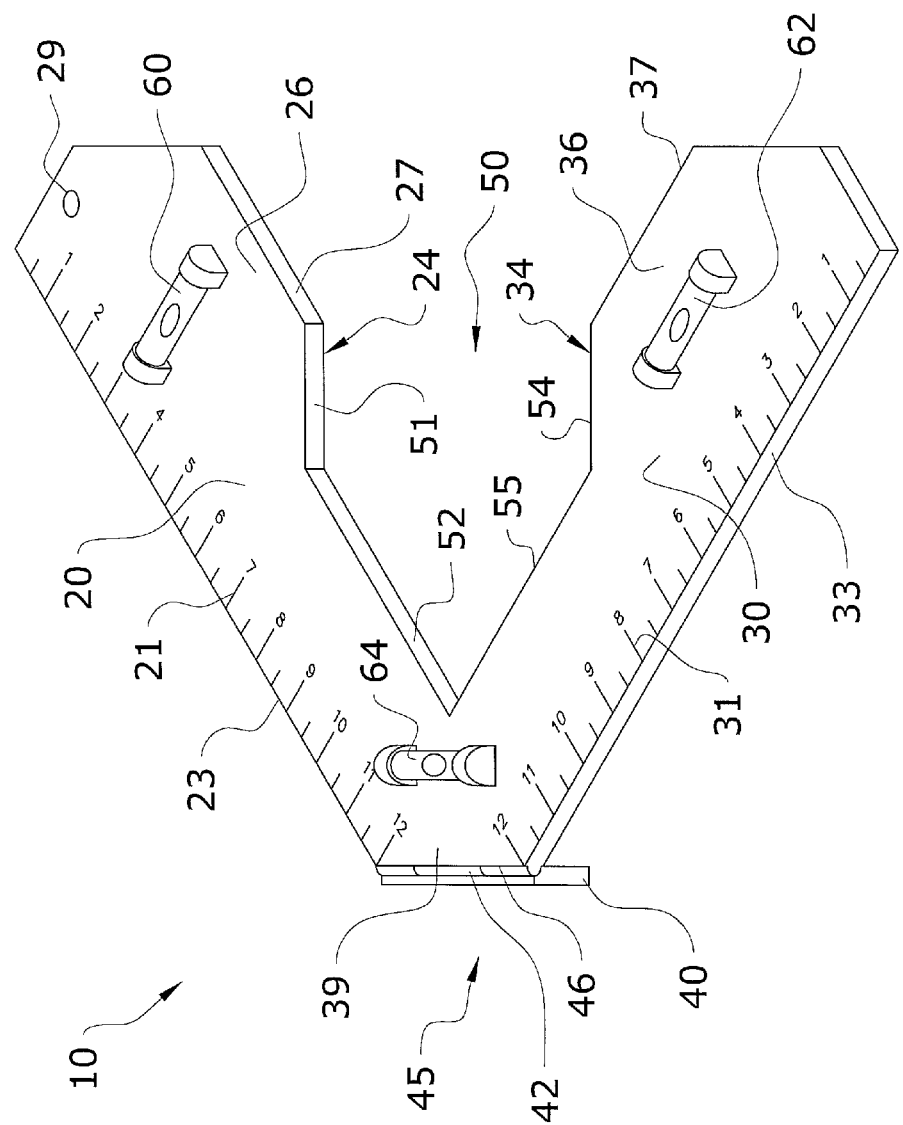
FIG. 3 is an upper perspective view of the present invention with the corner section pivoted out of the exterior notch to reveal the exterior notch.
Figure 4:
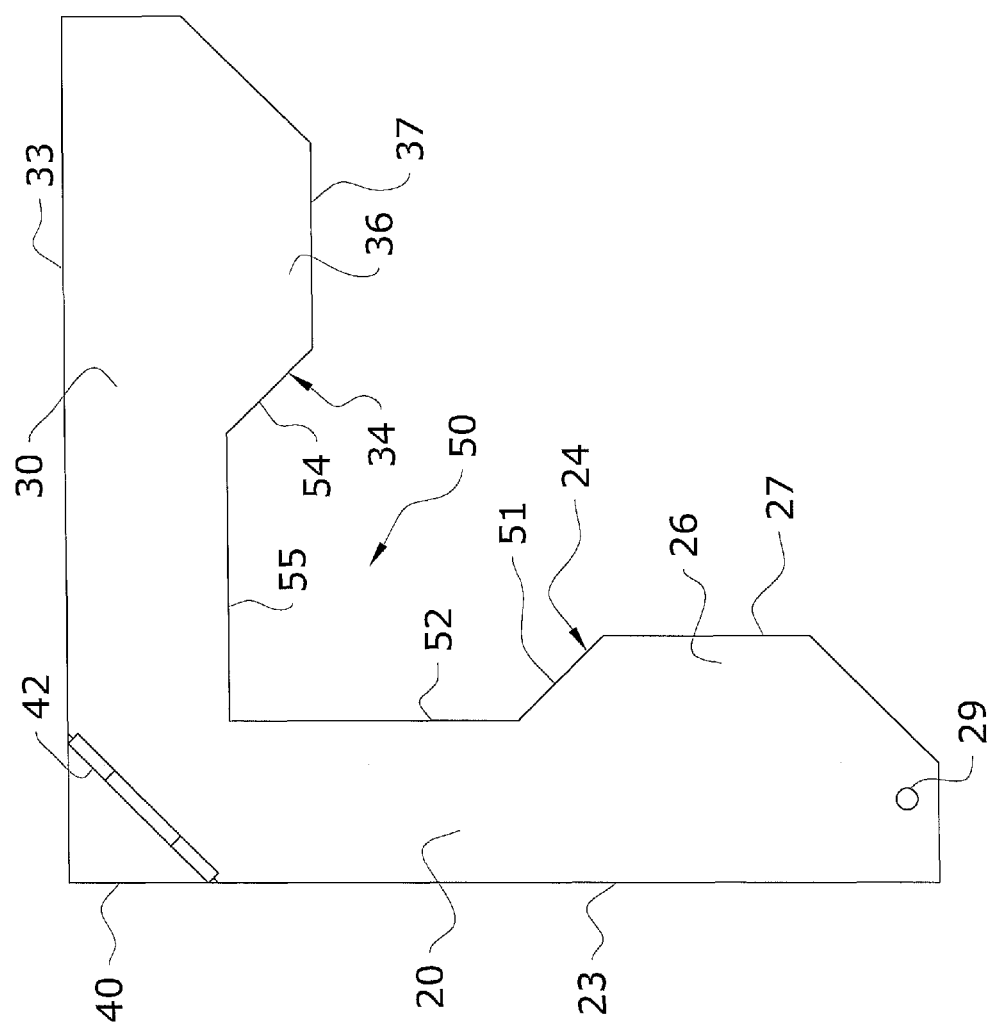
FIG. 4 is a bottom view of the present invention.

The arms 20, 30 also generally each include measuring indicia 21, 31 disposed along the linear length of each of the arms 20, 30 and preferably lining the exterior edge 23, 33 of the arms 20, 30. The measuring indicia 21, 31 may be in various forms such as inches, centimeters, etc. The arms 20, 30 may also be comprised of various lengths, such as standard one foot, three feet, etc. In addition, the exterior corner section 40 (when pivoted within the exterior notch 45) preferably adds an additional measuring length to each of the arms 20, 30. In the preferred embodiment, the arms 20, 30 are each comprised of a 12 inch length with the exterior section 40 adding an extra inch or half inch to the length of each of the arms 20, 30 as illustrated in FIGS. 1 and 2.

The exterior edges 23, 33 of each of the arms 20, 30 are preferably straight so as to fit flushly against adjacent sides 16 when measuring interior corners 12. The interior edge 24, 34 of each of the arms 20, 30 is preferably shaped to flushly receive a corner post of an exterior edge 23, 33 of a building as will be described later on. Each of the arms 20, 30 also generally include a projecting portion 26, 36 extending inwardly from the respective arm 20, 30 on an end substantially opposite the adjoining corner 39 of the first arm 20 and the second arm 30. The projecting portion 26, 36 extends inwardly so the edges 27, 37 rest flush against the sides 16 or siding 17 of the building when the corner post 14 is positioned within the interior corner notch 50 as will be described later on.

At least one of the arms 20, 30 may also include an aperture 29 extending therethrough for receiving a hanging device, such as a nail or hook, to suspend the tool 10 therefrom. The aperture 29 is generally located opposite the exterior corner section 40. It is appreciated that the arms 20, 30 may include various other indicia for measuring, reference, etc.

C. Exterior Corner Section

The exterior corner section 40 is located at the adjoining corner 39 on an exterior side of the first arm 20 and the second arm 30. The section 40 is generally pivotally connected to the adjoining corner 39 of the first arm 20 and the second arm 30 via one or more locking hinges 42. The locking hinges 42 allow for the section 40 to be pivoted to reveal the notch 45 and also work to lock the section 40 in place when concealing the notch 45. The section 40 is also generally comprised of a triangular shape to form a triangular shaped exterior notch 45 when pivoted. The hinges 42 preferably do not extend below the lower surface of the arms 20, 30 to allow the device 10 to rest level upon a surface.

By pivoting the section 40 so as to reveal the exterior notch 45, the tool is able to be positioned more closely to an interior corner 12 and the exterior edges 23, 33 of the first arm 20 and the second arm 30 are able to be positioned substantially flush with the adjacent sides 16 extending from the interior corner 12. It is appreciated that the exterior corner section 40 may or may not have indicia thereupon.

D. Interior Corner Notch

The interior corner notch 50 is located at the adjoining corner 39 on an interior side of the first arm 20 and the second arm 30. The tool 10 is able to be positioned more closely to an exterior corner post 14 and the interior edges 24, 34 of the first arm 20 and the second arm 30 along the edges of the projecting portions 26, 36 are able to be positioned substantially flush with the adjacent sides 16 of the exterior corner.

The interior corner notch 50 generally includes a first angled edge 51 defined by the projecting portion 26, 36 of the first arm 20. The first angled edge 51 leads to a first straight edge 52 leading to the interior side of the adjoining corner 39 of the first arm 20 and the second arm 30. A second angled edge 54 defined by the projecting portion 26, 36 of the second arm 30. The second angled edge 54 leads to a second straight edge 55 leading to the interior side of the adjoining corner 39 of the first arm 20 and the second arm 30. The first straight edge 52 and the second straight edge 55 define a 90 degree angle for receiving a rectangular or square cross-sectional corner post 14 commonly used when installing vinyl or other siding 17 upon buildings.

The angled edges 51, 54 allow for a more smooth entry and exit of the corner post 14 within the interior notch 50. The length of the first straight edge 52 and the second straight edge 55 are preferably suitable to receive various sized corner posts 14. It is appreciated that in various alternate embodiments of the present invention, the length of the first straight edge 52 and the second straight edge 55 may be adjusted by repositioning the placement of the first angled edge 51 and the second angled edge 54.

E. Levels

The tool 10 also generally includes a plurality of levels 60, 62, 64, preferably comprised of bubble levels for ensuring a horizontal, vertical, etc. orientation of the tool 10. The tool 10 generally include a first level 60 disposed along the first arm 20 preferably opposite the adjoining corner 39 and parallel with the second arm 30. A second level 62 is disposed along the second arm 30 preferably opposite the adjoining corner 39 and preferably also parallel with the second arm 30. A third level 64 is positioned upon the adjoining corner 39 and preferably angled disposed with respect to the first arm 20 and the second arm 30 at an approximate 45 degree angle to be parallel with the edge 46 of the notch 45 when the corner section 40 is pivoted to reveal the notch 45. It is appreciated that more or less levels may be used and the levels 60, 62, 64 may be positioned in a variety of other locations.

F. Operation of Preferred Embodiment

Figure 5:
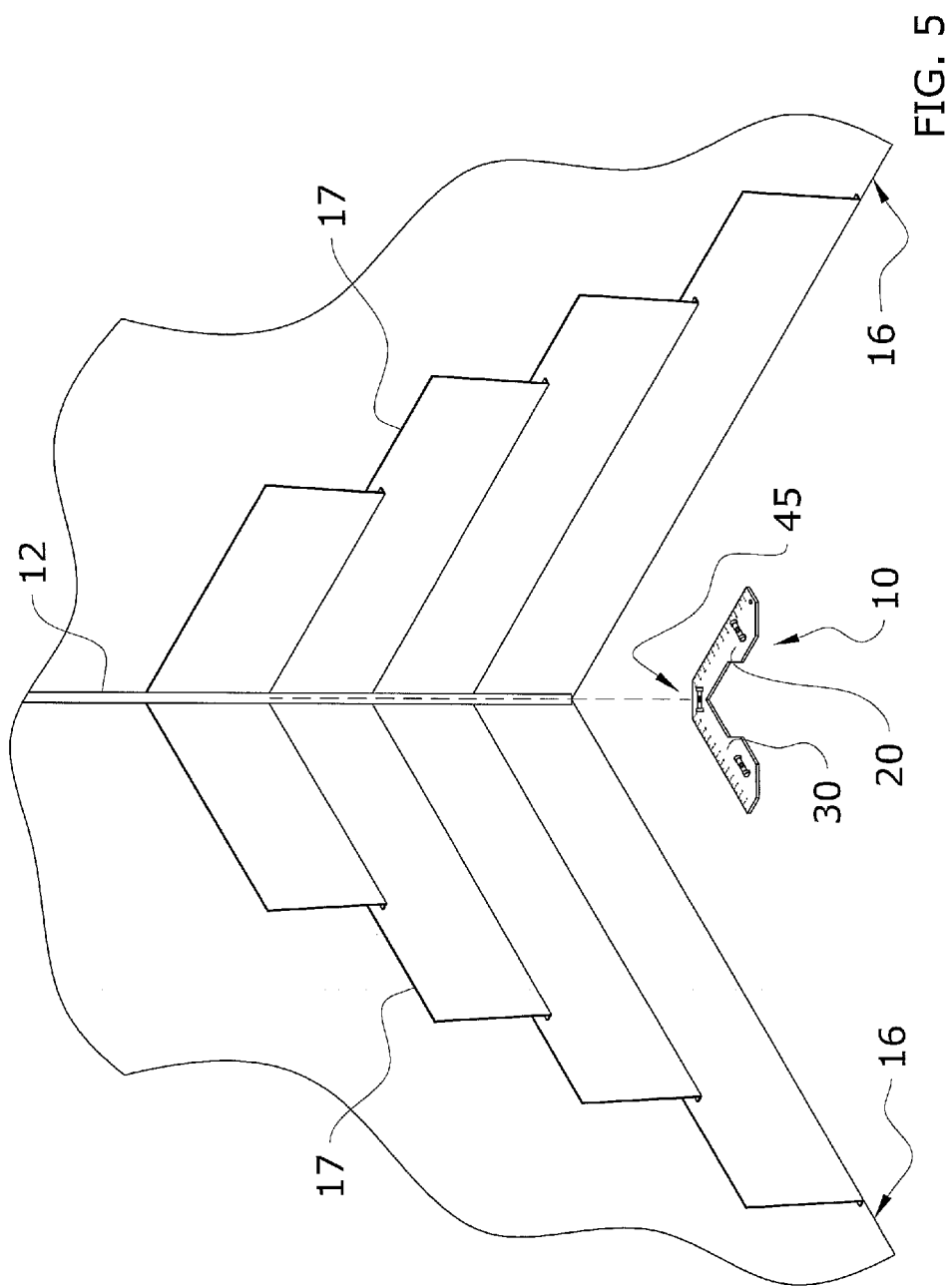
FIG. 5 is an upper perspective view of the present invention being used to measure an interior corner with the tool exploded from the corner.
Figure 6:
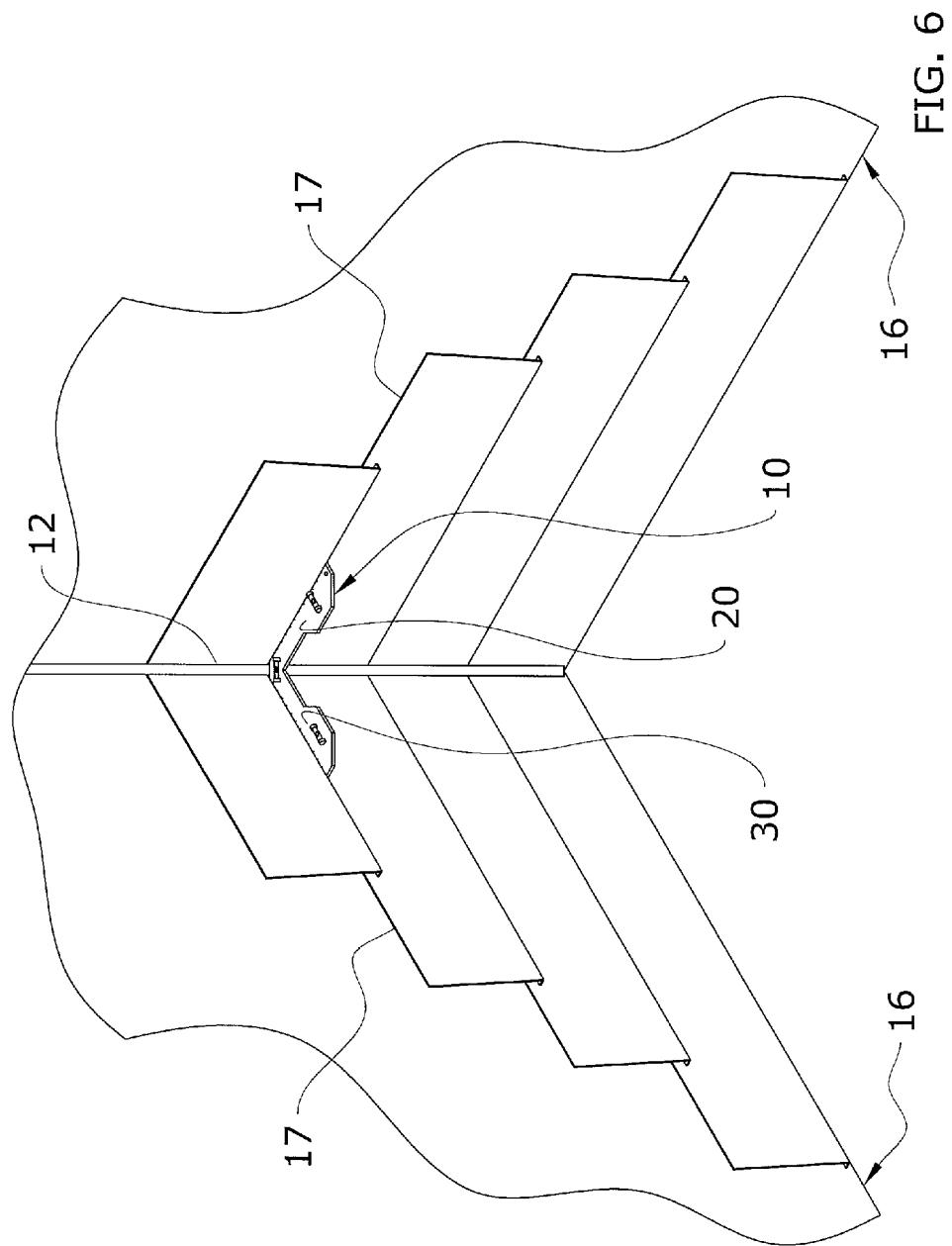
FIG. 6 is an upper perspective view of the present invention being used to measure an interior corner with the tool positioned against the corner.
Figure 7:
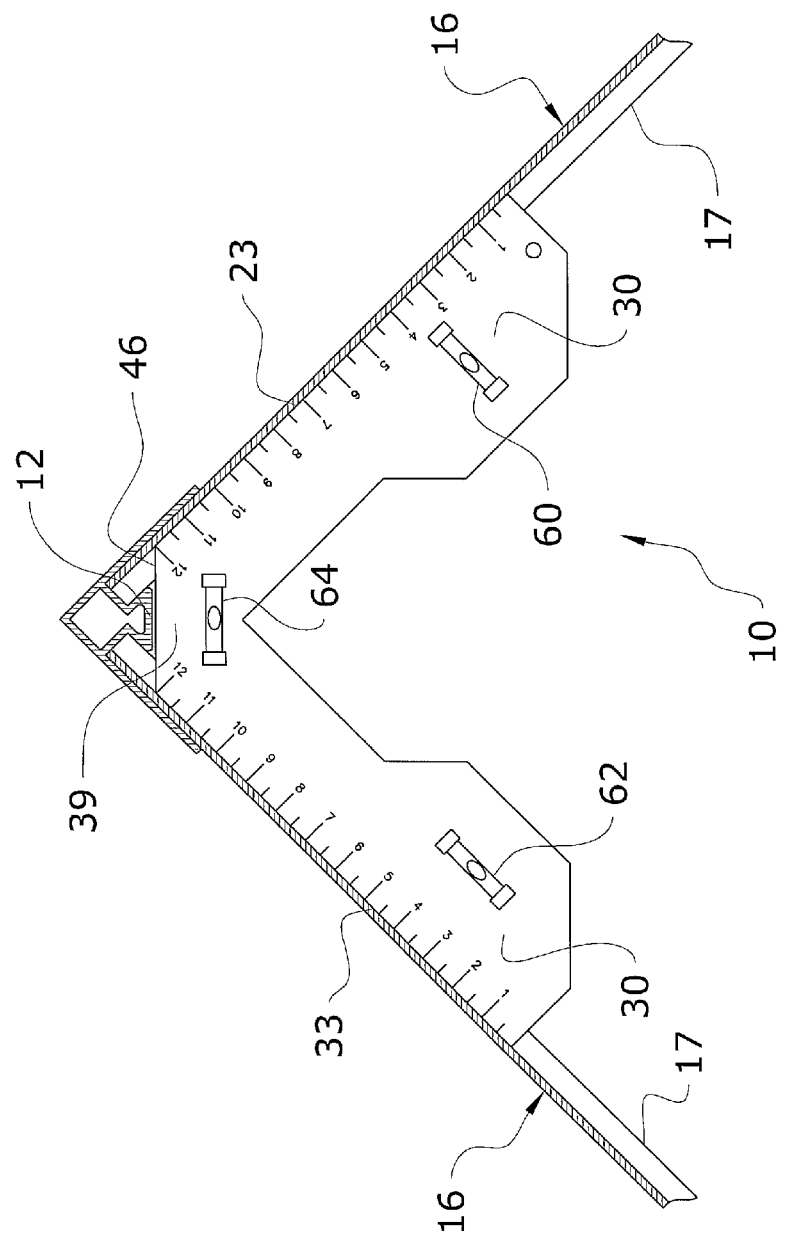
FIG. 7 is a top view of the present invention being used to measure an interior corner with the tool positioned against the corner.

In use, when measuring, squaring, leveling, etc. exterior corners of buildings or sides 16 adjacent to the exterior corners where utilization of the exterior corner is necessary, the tool 10 is oriented so that the interior corner notch 50 faces the exterior corner post 14 (in the case of vinyl or other siding 17 measurements) as illustrated in FIGS. 5 through 7. The corner post 14 is positioned within the interior corner notch 50 and the edges 27, 37 of the projections 26, 36 are positioned against the adjacent sides 16 of the building so as to be resting substantially flush upon the sides 16. The levels 60, 62, 64 may now be used to orient the tool 10 in a horizontal position to accurately position the siding 17 upon the two sides 16 horizontally level with one another.

Figure 8:
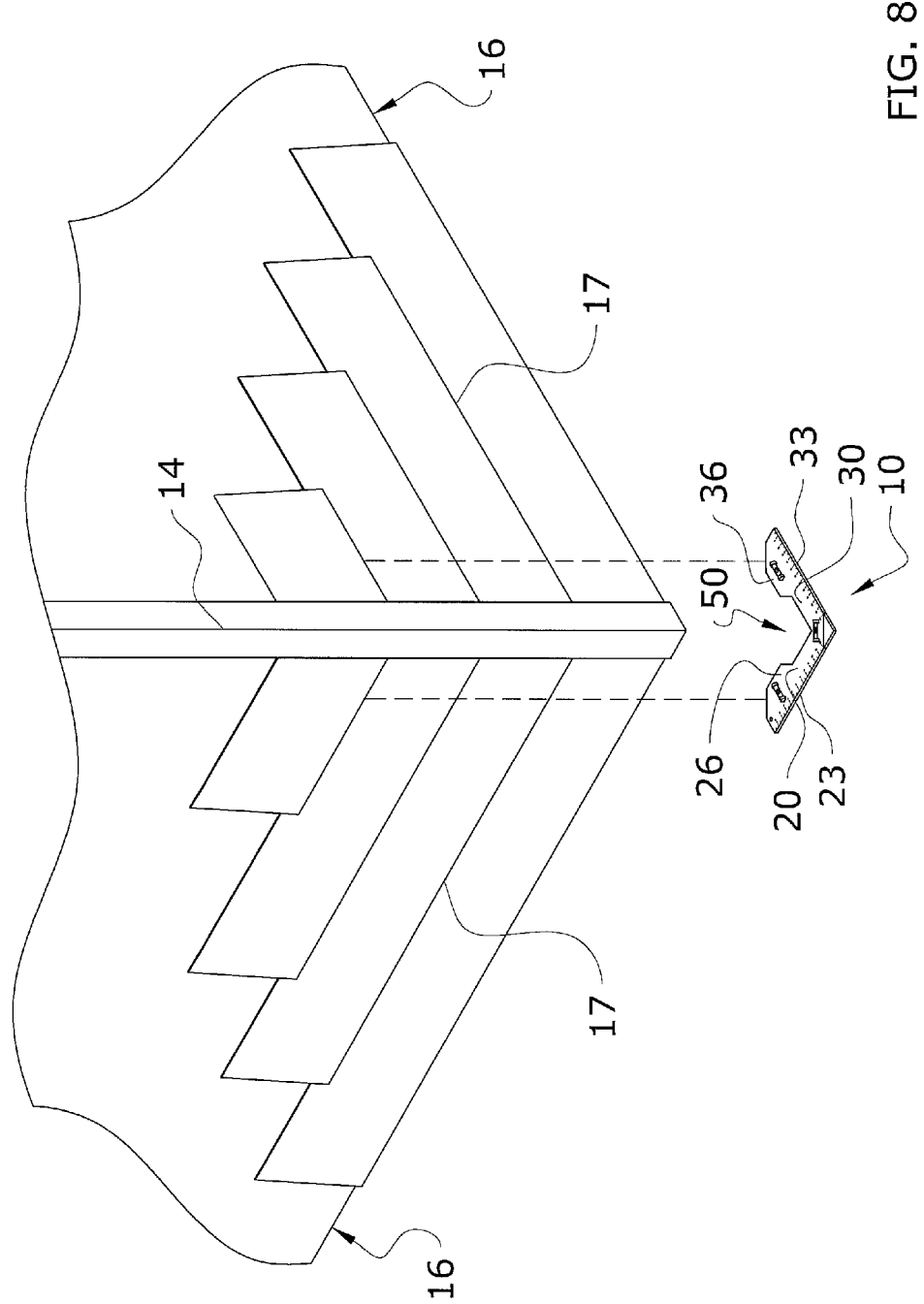
FIG. 8 is an upper perspective view of the present invention being used to measure an exterior corner with the tool exploded from the corner.
Figure 9:
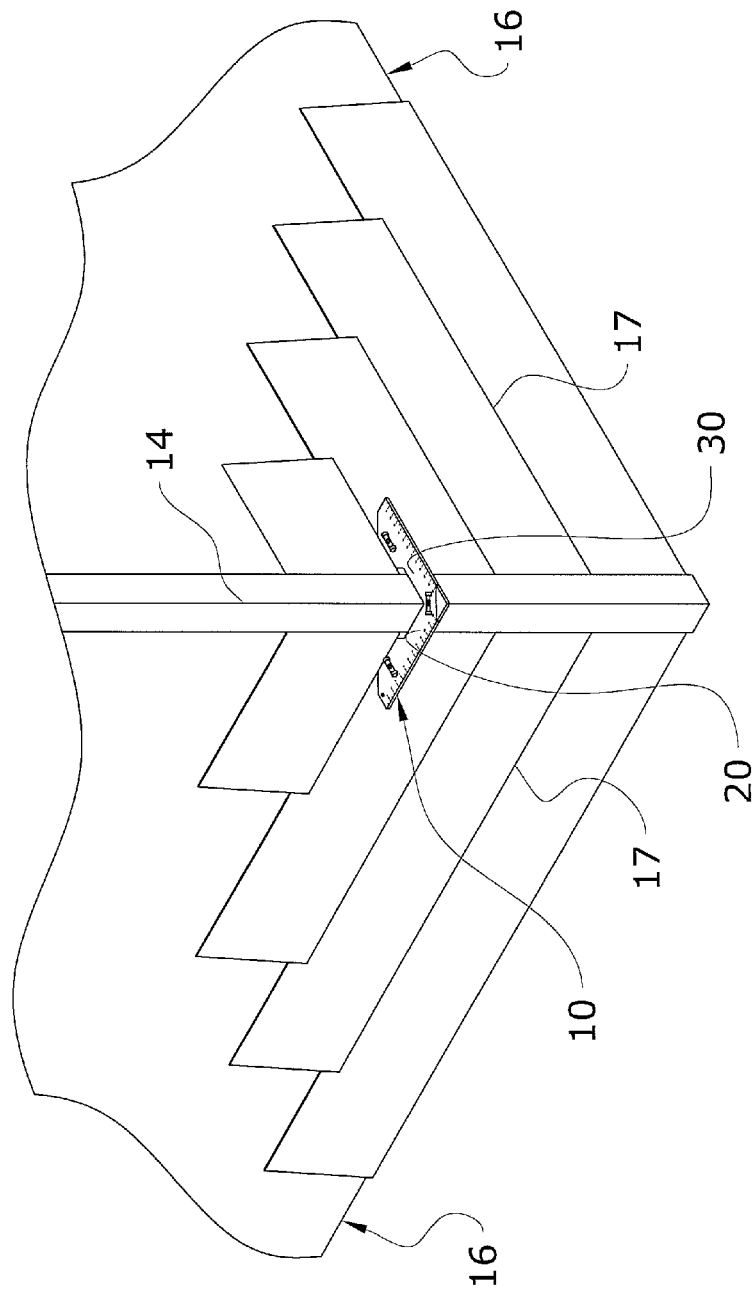
FIG. 9 is an upper perspective view of the present invention being used to measure an exterior corner with the tool positioned against the corner.
Figure 10:
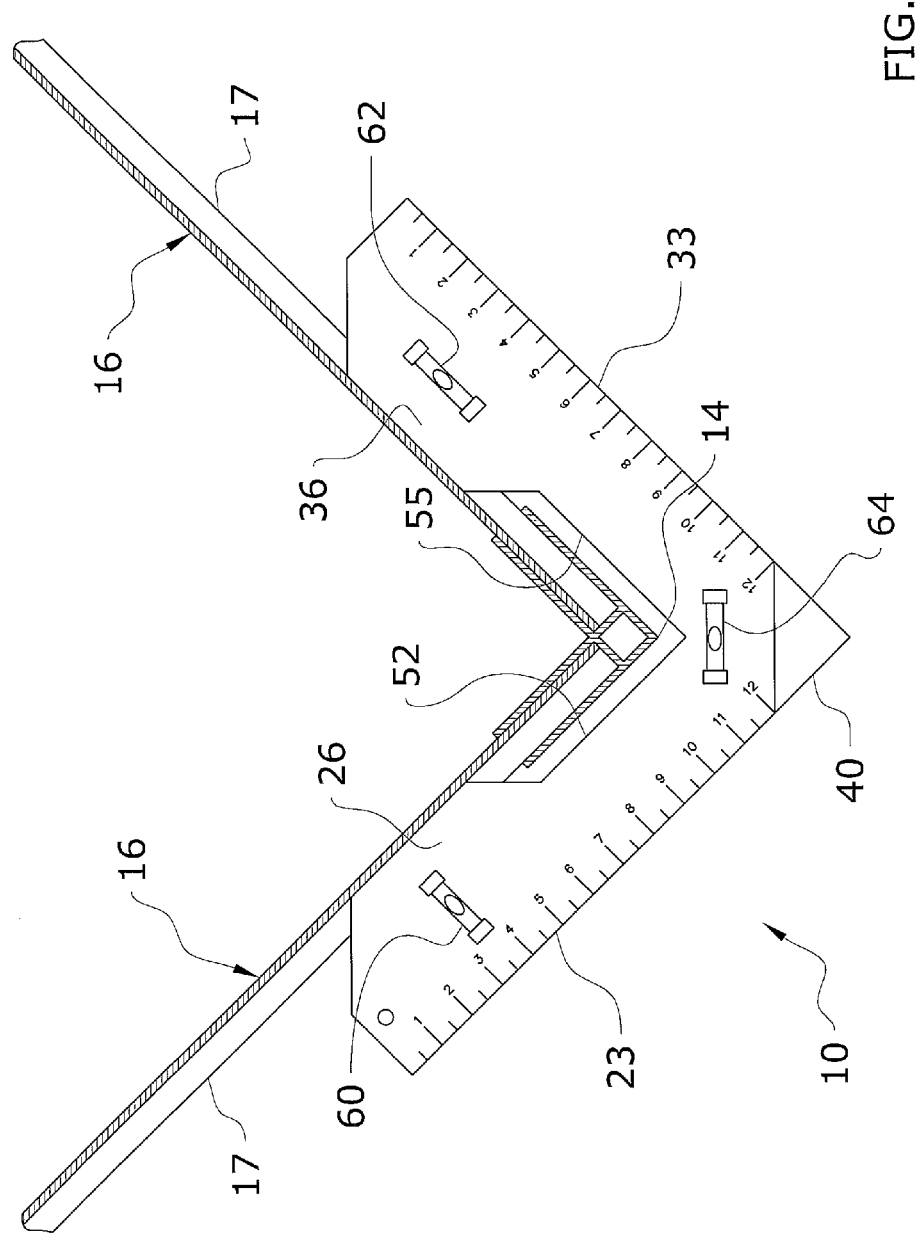
FIG. 10 is a top view of the present invention being used to measure an exterior corner with the tool positioned against the corner.

When measuring, squaring, leveling, etc. interior corners 12 of buildings or sides 16 adjacent to the interior corners 12 where utilization of the interior corner 12 is necessary, the tool 10 is oriented so that the exterior corner section 40 faces the interior corner 12 of the building as illustrated in FIGS. 8 through 10. The section 40 is pivoted downwards to expose the exterior notch 45 and the tool 10 is positioned against the sides 16 of the building with the exterior notch 45 positioned within the interior corner 12 and the exterior edges 23, 33 of the arms 20, 30 resting substantially flush upon the sides 16. The levels 60, 62, 64 may now be used to orient the tool 10 in a horizontal position to accurately position the siding 17 upon the two sides 16 horizontally level with one another.

It is appreciated that the tool 10 may be used for a variety of other purposes relating to squaring, measuring, leveling, etc different types of construction elements, objects, structures, etc. It is also appreciated that the tool may be used as a true square by pivoting the corner section 40 within the notch 45 to conceal the notch 45.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A tool, comprising:
   a first arm;
   a second arm angularly disposed from said first arm to form an approximate 90 degree angle with one another;
   an exterior corner section pivotally connected to said first arm and said second arm along adjoining exterior edges, wherein said exterior corner section pivots to selectively define an exterior notch between said first arm and said second arm; and
   an interior corner notch formed within adjoining interior edges of said first arm and said second arm.

2. The tool of claim 1, wherein said first arm has measuring indicia disposed along a first linear length of said first arm.

3. The tool of claim 2, wherein said second arm has measuring indicia disposed along a second linear length of said second arm.

4. The tool of claim 1, wherein said exterior notch is comprised of a triangular shape.

5. The tool of claim 1, including an aperture formed within said first arm opposite said exterior notch.

6. The tool of claim 1, including at least one level disposed along an outer surface of said first arm or said second arm.

7. The tool of claim 6, wherein said at least one level includes a plurality of levels.

8. The tool of claim 7, wherein said plurality of levels include:
   a first level disposed along said first arm substantially opposite said exterior corner section with respect to a first length of said first arm;
   a second level disposed along said second arm substantially opposite said exterior corner section with respect to a second length of said second arm; and
   a third level disposed at an intersection point of said first arm and said second arm adjacent said exterior corner section.

9. The tool of claim 1, wherein said interior notch is formed to flushly receive a right-angled corner post therewithin.

10. The tool of claim 1, wherein said interior notch includes:
   a first angled edge disposed along said interior edge of said first arm;
   a first straight edge disposed along said interior edge of said first arm, wherein said first angled edge leads to said first straight edge;
   a second angled edge disposed along said interior edge of said second arm; and
   a second straight edge disposed along said interior edge of said second arm, wherein said second angled edge leads to said second straight edge;
   wherein said first straight edge and said second straight edge define a 90 degree angle.

11. The tool of claim 10, wherein said first arm includes a first inwardly projecting portion defining said first angled edge and wherein said second arm includes a second inwardly projecting portion defining said second angled edge.

12. A tool for squaring and/or leveling exterior and interior corners, comprising:
   a first arm, wherein said first arm has measuring indicia disposed along a first linear length of said first arm;
   a second arm, wherein said second arm has measuring indicia disposed along a second linear length of said second arm;
   wherein said second arm is angularly disposed from said first arm to form an approximate 90 degree angle with one another;
   an exterior corner section pivotally connected to said first arm and said second arm along adjoining exterior edges, wherein said exterior corner section pivots to selectively define an exterior notch between said first arm and said second arm;
   wherein said exterior corner section is adapted to pivot to form said exterior notch to flushly receive an interior corner for measuring and/or leveling; and
   an interior corner notch formed within adjoining interior edges of said first arm and said second arm;
   wherein said interior corner notch is adapted to flushly receive an exterior corner post for measuring and/or leveling.

13. The tool of claim 12, wherein said exterior notch is comprised of a triangular shape.

14. The tool of claim 12, including at least one bubble level disposed along an outer surface of said first arm or said second arm.

15. The tool of claim 14, wherein said at least one bubble level includes a plurality of levels.

16. The tool of claim 15, wherein said plurality of levels include:
   a first level disposed along said first arm substantially opposite said exterior corner section with respect to a first length of said first arm;
   a second level disposed along said second arm substantially opposite said exterior corner section with respect to a second length of said second arm; and a third level disposed at an intersection point of said first arm and said second arm adjacent said exterior corner section.

17. The tool of claim 12, wherein said interior notch is formed to flushly receive a right-angled corner post therewithin.

18. The tool of claim 12, wherein said interior notch includes:
   a first angled edge disposed along said interior edge of said first arm;
   a first straight edge disposed along said interior edge of said first arm, wherein said first angled edge leads to said first straight edge;
   a second angled edge disposed along said interior edge of said second arm; and
   a second straight edge disposed along said interior edge of said second arm, wherein said second angled edge leads to said second straight edge;
   wherein said first straight edge and said second straight edge define a 90 degree angle.

19. The tool of claim 18, wherein said first arm includes a first inwardly projecting portion defining said first angled edge and wherein said second arm includes a second inwardly projecting portion defining said second angled edge.

20. A tool for squaring and/or leveling exterior and interior corners, comprising:
   a first arm, wherein said first arm has measuring indicia disposed along a first linear length of said first arm;
   a second arm, wherein said second arm has measuring indicia disposed along a second linear length of said second arm;
   wherein said second arm is angularly disposed from said first arm to form an approximate 90 degree angle with one another;
   an exterior corner section pivotally connected to said first arm and said second arm along adjoining exterior edges, wherein said exterior corner section pivots to selectively define an exterior notch between said first arm and said second arm;
   wherein a hinge used to pivot said exterior corner section is comprised of a locking hinge;
   wherein said exterior notch is comprised of a triangular shape;
   wherein said exterior corner section is adapted to pivot to form said exterior notch to flushly receive an interior corner for measuring and/or leveling;
   an interior corner notch formed within adjoining interior edges of said first arm and said second arm;
   wherein said interior notch includes:
      a first angled edge disposed along said interior edge of said first arm;
      a first straight edge disposed along said interior edge of said first arm,
   wherein said first angled edge leads to said first straight edge;
      a second angled edge disposed along said interior edge of said second arm; and
      a second straight edge disposed along said interior edge of said second arm, wherein said second angled edge leads to said second straight edge;
      wherein said first straight edge and said second straight edge define a 90 degree angle;
   wherein said first arm includes a first inwardly projecting portion defining said first angled edge and wherein said second arm includes a second inwardly projecting portion defining said second angled edge;
   wherein said interior corner notch is adapted to flushly receive an exterior corner post for measuring and/or leveling;
   a first bubble level disposed along said first arm substantially opposite said exterior corner section with respect to a first length of said first arm;
   wherein said first bubble level is parallel to said second linear length of said second arm;
   a second bubble level disposed along said second arm substantially opposite said exterior corner section with respect to a second length of said second arm;
   wherein said second bubble level is parallel to said second linear length of said second arm; and
   a third bubble level disposed at an intersection point of said first arm and said second arm adjacent said exterior corner section;
   wherein said third bubble level is angularly disposed to said first arm and said second arm at an approximate 45 degree angle.

\* \* \* \* \*